US007986520B2

(12) United States Patent
Yamaguchi et al.

(10) Patent No.: US 7,986,520 B2
(45) Date of Patent: Jul. 26, 2011

(54) ELECTRONIC DEVICE

(75) Inventors: Akifumi Yamaguchi, Kawasaki (JP);
Nobuto Fujiwara, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/710,187

(22) Filed: Feb. 22, 2010

(65) Prior Publication Data

US 2010/0321888 A1 Dec. 23, 2010

(30) Foreign Application Priority Data

Jun. 22, 2009 (JP) ................................. 2009-147857

(51) Int. Cl.
*G06F 1/20* (2006.01)
*H05K 7/20* (2006.01)

(52) U.S. Cl. ......... 361/679.47; 361/679.52; 361/679.54; 361/679.55; 361/695; 361/697; 361/700; 361/704; 361/709; 361/719; 165/80.3; 165/185; 174/15.2; 174/16.1; 174/16.3

(58) Field of Classification Search . 361/679.47–679.48, 679.52, 679.54–679.55, 361/694–695, 697, 699–700, 703–704, 709, 361/719; 165/80.2–80.4, 104.33, 185; 174/15.2, 174/16.1, 16.3; 454/184
See application file for complete search history.

(56) References Cited

U.S. PATENT DOCUMENTS

| 5,647,429 | A  | * | 7/1997  | Oktay et al. ............. 165/104.26 |
| 6,621,698 | B2 | * | 9/2003  | Chang ....................... 361/679.47 |
| 6,942,016 | B2 | * | 9/2005  | Kobayashi et al. ............. 165/47 |
| 7,639,503 | B2 | * | 12/2009 | Tanaka .......................... 361/719 |
| 7,652,885 | B2 | * | 1/2010  | Tomioka ........................ 361/700 |
| 7,701,716 | B2 | * | 4/2010  | Blanco et al. ................. 361/699 |
| 7,738,248 | B2 | * | 6/2010  | Tomioka ................... 361/679.52 |
| 2008/0253082 | A1 | * | 10/2008 | Lev et al. ..................... 361/687 |
| 2009/0103262 | A1 | * | 4/2009  | Hata .............................. 361/689 |
| 2010/0002388 | A1 | * | 1/2010  | Tanaka .......................... 361/695 |
| 2010/0246125 | A1 | * | 9/2010  | Okutsu .......................... 361/695 |

FOREIGN PATENT DOCUMENTS

| JP | 10-281671      |   | 10/1998 |
| JP | 11-017375      |   | 1/1999  |
| JP | 2008-084019    |   | 4/2008  |
| JP | 2008-089253    |   | 4/2008  |
| JP | 2008-244320    |   | 10/2008 |
| JP | 2009-080567    |   | 4/2009  |
| JP | 2009080567  A | * | 4/2009  |
| JP | 2009-150561    |   | 7/2009  |
| JP | 2009181215  A | * | 8/2009  |
| JP | 2010010609  A | * | 1/2010  |
| JP | 2010033103  A | * | 2/2010  |
| JP | 2010072904  A | * | 4/2010  |

* cited by examiner

*Primary Examiner* — Robert J Hoffberg
(74) *Attorney, Agent, or Firm* — Knobbe Martens Olson & Bear LLP

(57) ABSTRACT

According to one embodiment, an electronic device includes a printed wiring board, a first heat generating part and a second heat generating part secured to one surface of the printed wiring board, a plurality of first heat pipes, a second heat pipe and a heat sink. The first heat pipes each include a first end portion, a second end portion on an opposite side to the first end portion and a middle portion located between the first and second end portions and thermally connected to the first heat generating part. The second heat pipe includes a third end portion connected to the second end portion and a fourth end portion provided on an opposite side to the third end portion and thermally connected to the second heat generating part. The second heat pipe has a width dimension larger than that of the first heat pipe.

10 Claims, 7 Drawing Sheets

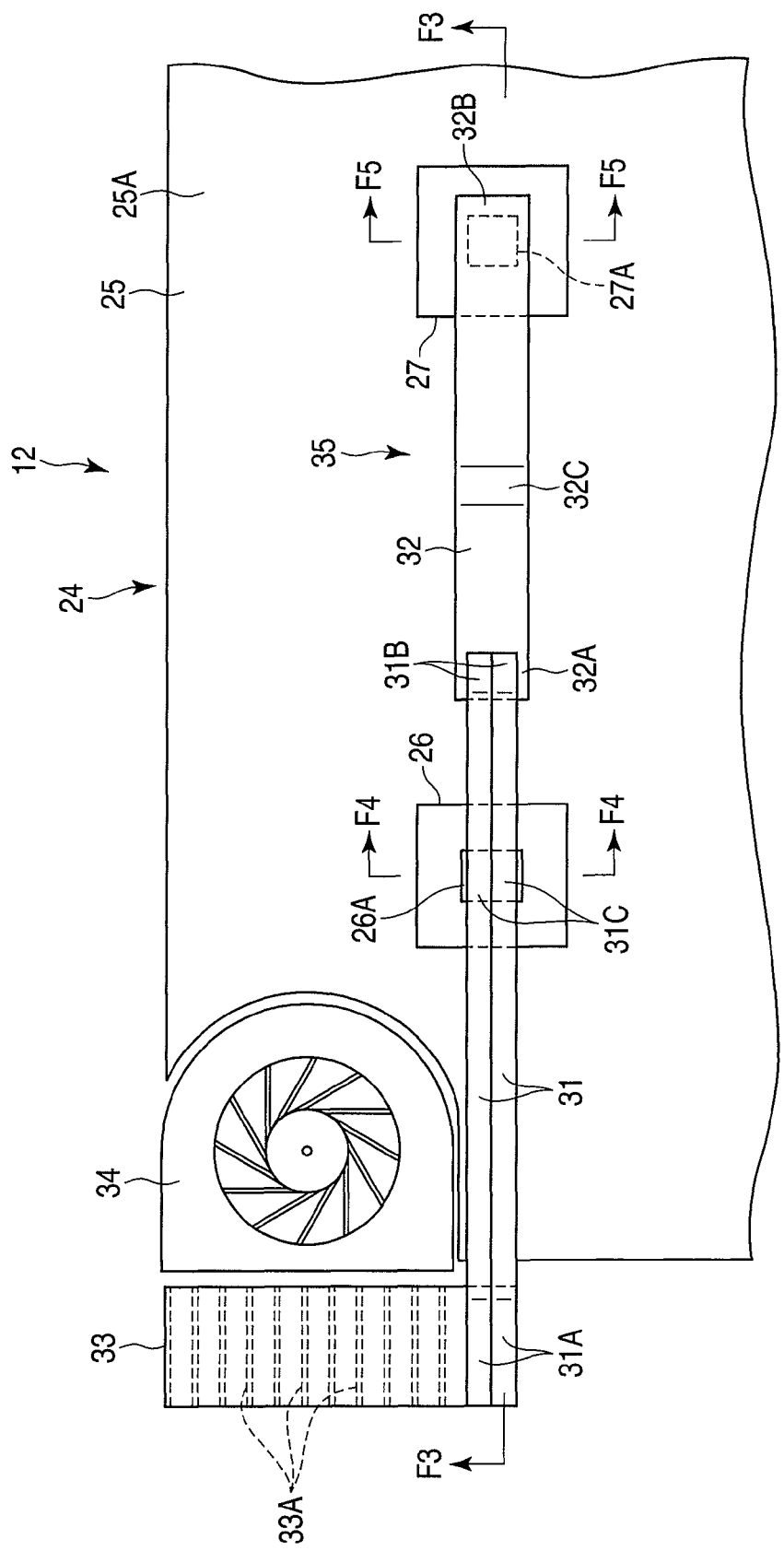
F I G. 2

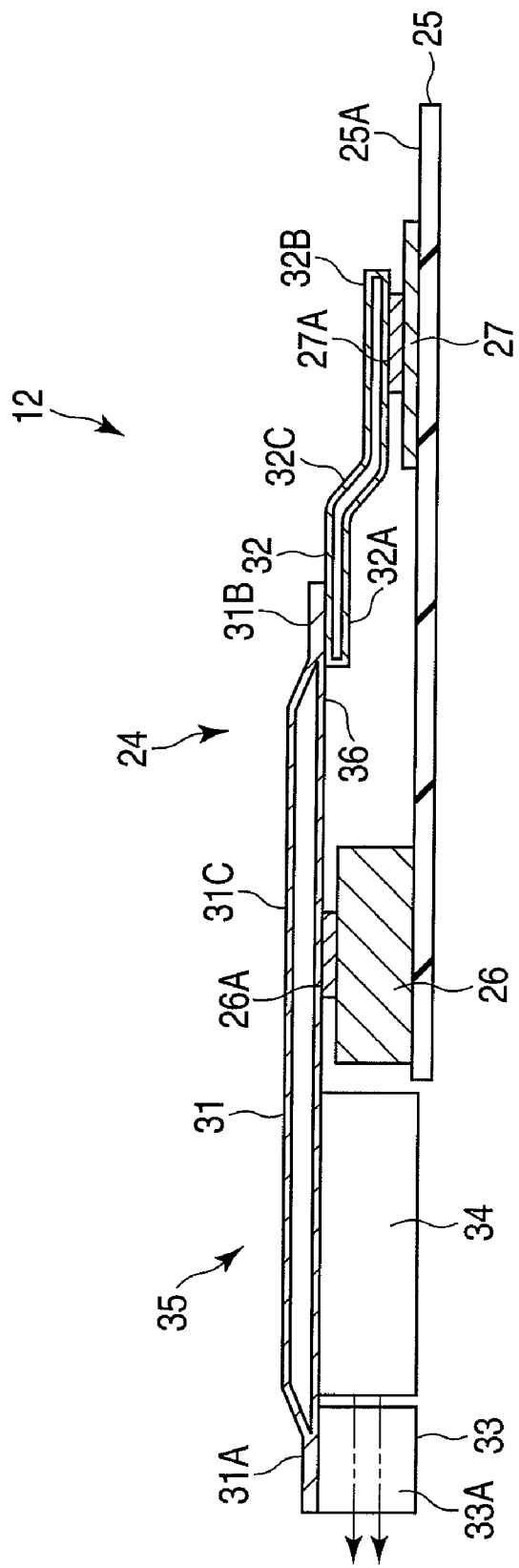
F I G. 3

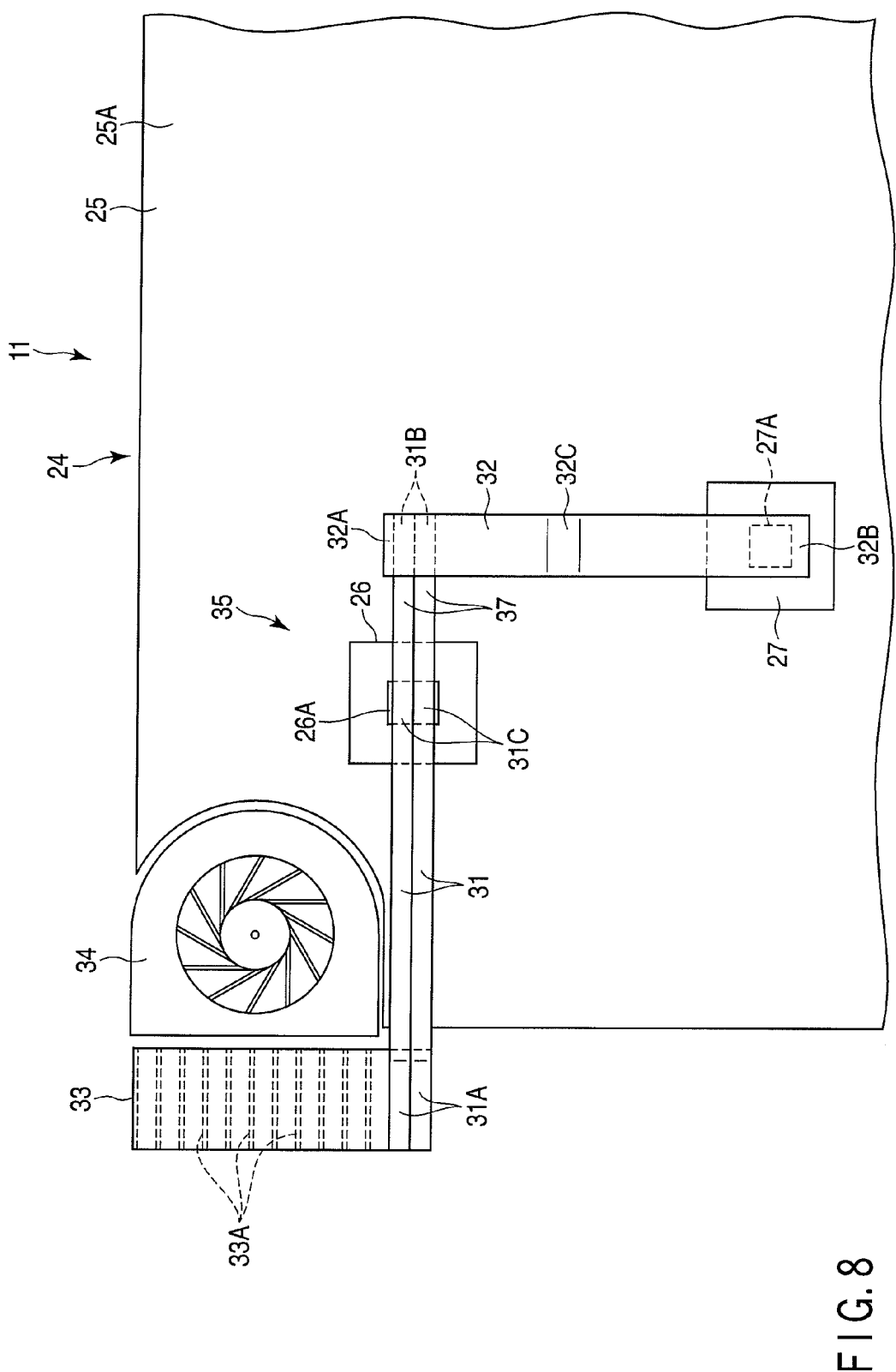
F I G. 8

ELECTRONIC DEVICE

CROSS-REFERENCE TO RELATED APPLICATIONS

This application is based upon and claims the benefit of priority from Japanese Patent Application No. 2009-147857, filed Jun. 22, 2009, the entire contents of which are incorporated herein by reference.

BACKGROUND

1. Field

One embodiment of the invention relates to an electronic device comprising a heat pipe.

2. Description of the Related Art

A heat pipe module which can be made long is disclosed in Jpn. Pat. Appln. KOKAI Publication No. 10-281671. This heat pipe module is made long by connecting a number of flat-shaped heat pipes each as a unit module.

This document describes that as the inner diameter of a pipe is smaller, the practical heat transportable distance is shorter. The heat pipe module this document has solved the problem of the heat transport distance due to the flat-shaped structure of the heat by connecting a plurality of flat-shaped heat pipes to each other.

However, in the above-described conventional heat pipe module, a great number of heat pipes are connected to each other. Therefore, not only the structure of the module is complicated, but also the assembling step for the heat pipe module is complicated.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary top view of a printed circuit board and a cooling mechanism housed inside the housing of the portable computer shown in FIG. 1;

FIG. 3 is an exemplary cross sectional view of the printed circuit board and the cooling mechanism shown in FIG. 2 taken along the line F3-F3;

FIG. 8 is an exemplary top view of a printed circuit board and a cooling mechanism of a portable computer according to the fourth embodiment.

DETAILED DESCRIPTION

Various embodiments according to the invention will be described hereinafter with reference to the accompanying drawings. In general, according to one embodiment of the invention, an electronic device includes a printed wiring board, a first heat generating part and a second heat generating part secured to one surface of the printed wiring board, a plurality of first heat pipes, a second heat pipe and a heat sink. The first heat pipes each include a first end portion, a second end portion on an opposite side to the first end portion and a middle portion located between the first and second end portions and thermally connected to the first heat generating part. The second heat pipe includes a third end portion connected to the second end portion and a fourth end portion provided on an opposite side to the third end portion and thermally connected to the second heat generating part. The second heat pipe has a width dimension larger than that of the first heat pipe.

The first embodiment of the electronic device will now be described with reference to FIGS. 1 to 5. In this specification, the near side to the user (that is, user side) is defined as front direction F, the far side from the user is rear direction R, the left-hand side of the user is left direction, the right-hand side of the user is right direction, the upper side from the user's position is up direction and the lower side from the user's position is down direction.

Figure 1:
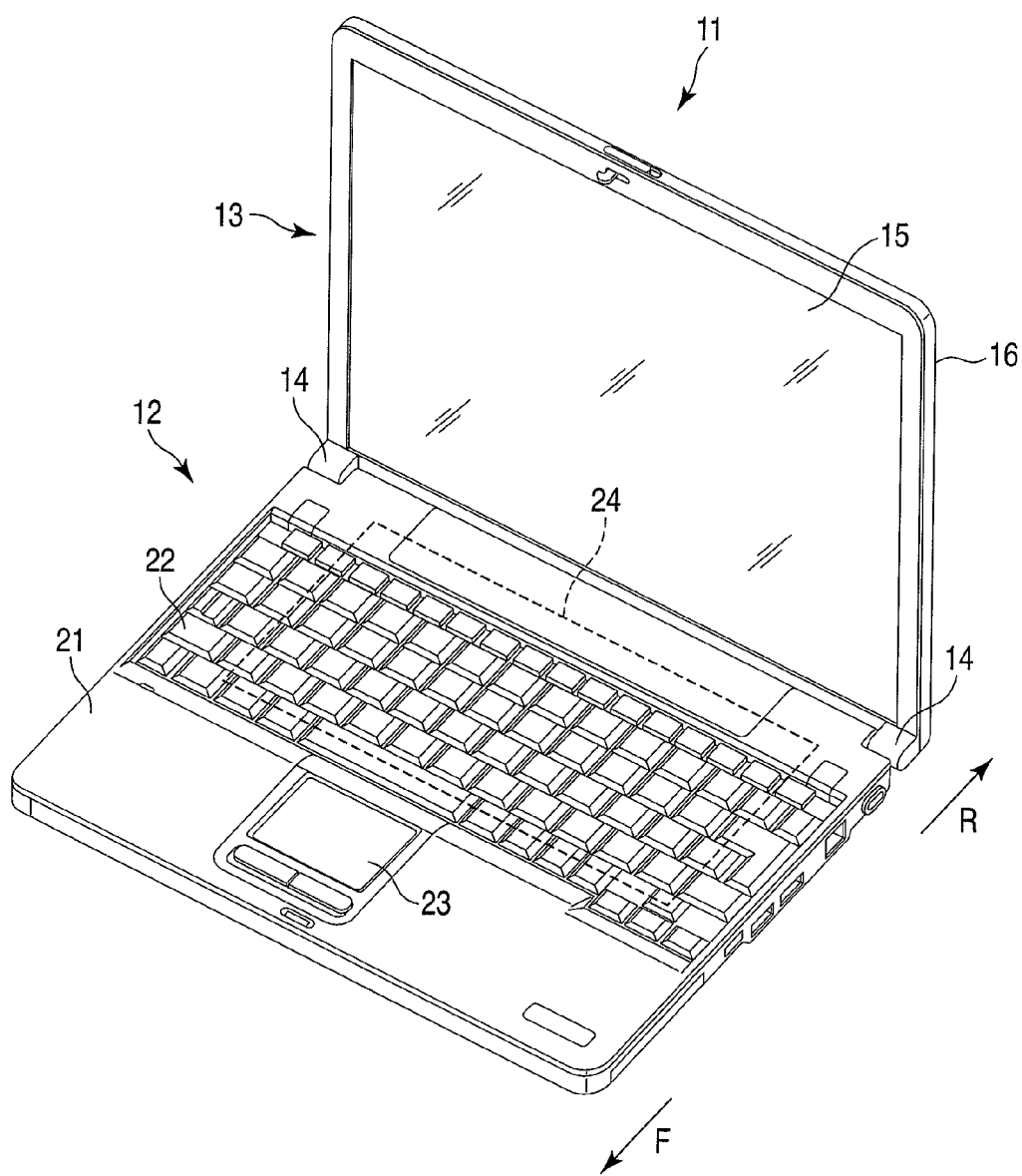
FIG. 1 is an exemplary perspective diagram showing a portable computer according to the first embodiment.

As shown in FIG. 1, a portable computer 11, which is an example of the electronic device, includes a main body unit 12, a display unit 13, and a hinge portion 14 provided between the main body unit 12 and the display unit 13. The hinge portion 14 supports the display unit 13 such as to be pivotable with respect to the main body unit 12. The display unit 13 includes a display 15 and a cover 16, which is made of a synthetic resin such as to surround the display 15. In this example, a liquid crystal display is used as an example of the display 15.

As shown in FIGS. 1 to 3, the main body unit 12 comprises a housing 21 made of a synthetic resin, a keyboard 22 and a touch pad 23, which are mounted to the housing 21. Further, the main body unit 12 contains a printed circuit board 24 housed inside the housing 21.

As shown in FIG. 2, the printed circuit board 24 includes a printed wiring board 25, a first heat generating part 26 and a second heat generating part 27, which are secured on one surface 25A of the printed wiring board 25. The first heat generating part 26 and the second heat generating part 27 are arranged to be side-to-side on the same straight line. The first heat generating part 26 includes a first top face 26A at its top, whereas the second heat generating part 27 includes a second top face 27A at its top.

As shown in FIG. 3, the projecting height of the second top face 27A with respect to one surface 25A of the printed wiring board 25 is different from the projecting height of the first top face 26A with respect to one surface 25A of the printed wiring board 25. More specifically, the projecting height of the second top face 27A is lower than the projecting height of the first top face 26A.

As shown in FIGS. 2 and 3, the main body unit 12 further includes, inside the housing 21, a first heat pipe 31 and a second heat pipe 32 which cool down the first heat generating part 26 and the second heat generating part 27, respectively, a heat sink 33 and a fan unit 34 which promotes the cooling of these parts. The first heat pipe 31, the second heat pipe 32, the heat sink 33 and the fan unit 34 constitute a cooling mechanism 35 which cools down the first heat generating part 26 and the second heat generating part 27. The heat sink 33 includes a plurality of fins 33A each having a square plate shape.

Figure 4:
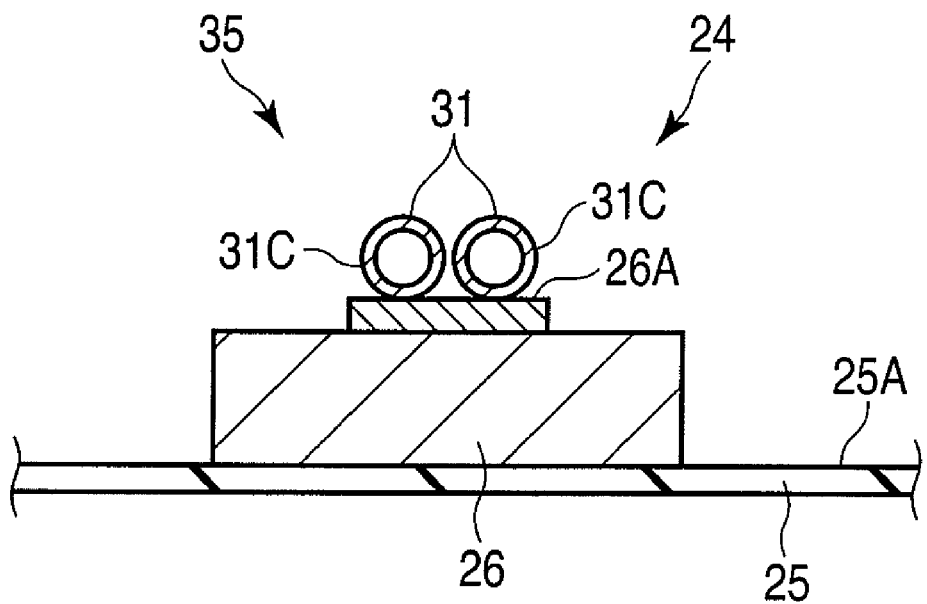
FIG. 4 is an exemplary cross sectional view of the printed circuit board and the cooling mechanism shown in FIG. 2 taken along the line F4-F4.

As shown in FIG. 4, the first heat pipe 31 is formed by filling with a working fluid such as water inside a container formed of a copper material into a cylindrical shape and sealing it. The first heat pipe 31 comprises a plurality of heat pipe portions. In this embodiment, for example, two heat pipe portions are included. Note that the first heat pipe 31 may includes two or more heat pipe portions.

As shown in FIG. 2, the first heat pipe 31 is formed into a rod shape as a whole, and it comprises a first end portion 31A connected to the heat sink 33, a second end portion 31B located on an opposite side to the first end portion 31A, and an middle portion 31C provided at a position located between the first end portion 31A and the second end portion 31B. The first heat pipe 31 is thermally connected to the first heat generating part 26 at the middle portion 31C. It should be noted that a heat conductive grease or the like is provided to intercalate between the middle portion 31C and the first heat generating part 26. Further, a metal-made plate material such as of copper may be intercalated between the middle portion 31C and the first heat generating part 26 as a heat receiving plate, in order to improve the heat conductivity. The heat pipe 31 extends linearly along the first top surface 26A of the first heat generating part 26.

Figure 5:
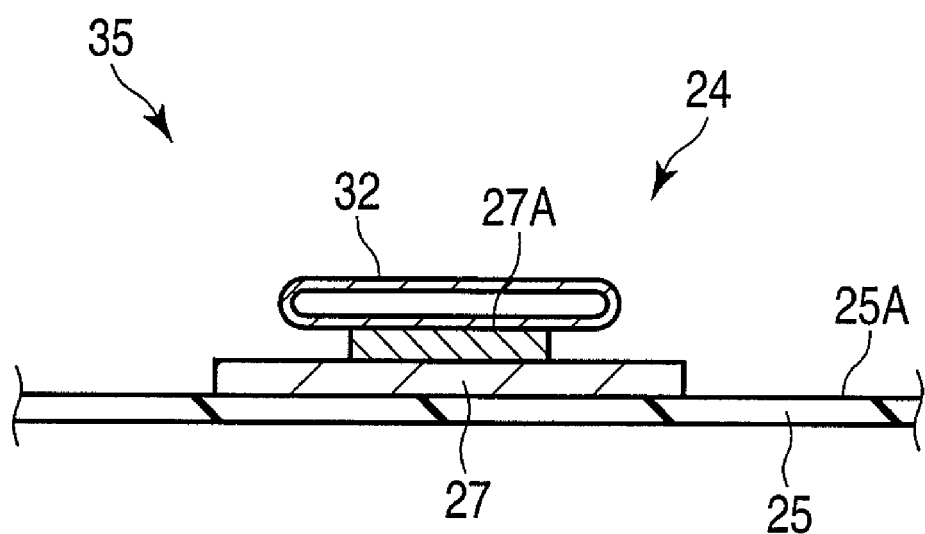
FIG. 5 is an exemplary cross sectional view of the printed circuit board and the cooling mechanism shown in FIG. 2 taken along the line F5-F5.

As shown in FIGS. 2 and 5, the second heat pipe 32 is formed by filling with a working fluid such as water inside a container formed of a copper material into a hollow flat plate shape and sealing it. The second heat pipe 32 extends in a direction in parallel with the first heat pipe 31. The second heat pipe 32 is larger than the first heat pipe 31 in width dimension, and is formed into a wide and flat rod shape. The second heat pipe 32 has a thickness of, for example, about 1 mm, and it is a thin heat pipe having a thickness smaller than that of the first heat pipe 31 and a flat elliptical cross section.

The second heat pipe 32 comprises a third end portion 32A connected to the first end portion 31A of the first heat pipe 31, a fourth end portion 32B located on an opposite side to the third end portion 32A, and a bent portion 32C provided at a position located between the third end portion 32A and the fourth end portion 32B. The bent portion 32C is smoothly bent such as to make the third end portion 32A placed along the second end portion 31B, and to make the fourth end portion 32B placed along the second top surface 27A.

It should be noted that in FIG. 3, the difference in height between the first heat generating part 26 and the second heat generating part 27 is shown with emphasis, but in reality, the difference in height between the first heat generating part 26 and the second heat generating part 27 is very small, and the bent portion 32c is formed to be bent in very small amount.

The fourth end portion 32B is thermally connected to the second heat generating part 27. The third end portion 32A of the second heat pipe 32 is secured to a surface 36 of the second end portion 31B, which opposes the printed wiring board 25. With this arrangement, the second heat pipe 32 is positioned to a position close to the second top surface 27A of the second heat generating part 27, and thus the bent amount of the bent portion 32 is suppressed to a small level. The second end portion 31B and the fourth end portion 32B are secured to each other by, for example, soldering.

Next, with reference to FIGS. 2 and 3, the cooling operation of the first heat pipe 31 and the second heat pipe 32 in the portable computer 11 according to this embodiment will now be described. First, the heat generated from the second heat generating part 27 is transmitted to the fourth end portion 32B of the second heat pipe 32, where the heat is transmitted to the portion of the working fluid which vaporizes at this section. The evaporated portion of the working fluid transport the heat from the fourth end portion 32B to the third end portion 32A, and the evaporated working fluid liquefies at the third end portion 32A to release the heat to the surrounding. The heat released at the third end portion 32A is transmitted to the second end portion 31B of the first heat pipe 31, and then transmitted to the portion of the working fluid which evaporates at the second end portion 31B. By means of the evaporated portion of the working fluid, the heat is transported from the second end portion 31B to the first end portion 31A.

In a similar manner, the heat generated from the first heat generating part 26 is transmitted to the middle portion 31C of the first heat pipe 31. The heat is transmitted to the first end portion 31A by the vaporization of the working fluid at the middle portion 31C and the liquefying of the working fluid at the first end portion 31A. In this manner, the heat collected from the first heat generating part 26 and the second heat generating part 27 to the first end portion 31A of the first heat pipe 31 is transmitted to the heat sink 33. To the heat sink 33, air is supplied from the fan unit 34, and thus the heat is transmitted to the air, which is further discharged to the outside of the housing 21 via an opening formed in the housing.

It should be noted that in some cases, portion of the heat generated from the first heat generating part 26 is propagated towards the second end portion 31B from the middle portion 31C through the heat pipe 31. However, the flow of the working fluid heading from the second end portion 31B towards the first end portion 31A is created due to the heat generated from the second heat generating part 27, and therefore the adverse effect of the counter-flow described above can be suppressed to a low level. Further, in order to minimize the adverse effect of the counter-flow, it is preferable that the second heat generating part 27 should be formed to generate more heat than that of the first heat generating part 26.

According to the first embodiment, the portable computer 11 includes the printed wiring board 25, the first heat generating part 26 and the second heat generating part 27 secured to one surface of the printed wiring board 25, a plurality of the first heat pipes 31 each including the first end portion 31A, the second end portion 31B located on the opposite side to the first end portion 31A, and the middle portion 31C provided between these end portions and thermally connected to the first heat generating part 26, the second heat pipe 32 including the third end portion 32A connected to the second end portion 31B, the fourth end portion 32B located on the opposite side to the third end portion 32A, thermally connected to the second heat generating part 27 and having a width dimension larger than that of the first heat pipe 31, and the heat sink 33 connected to the first end portion 31A.

With this structure, the second heat pipe 32 is wider than the first heat pipe 31, and therefore a plurality of the first heat pipes 31 are connected to be side by side to the second heat pipe 32. With this arrangement, a plurality of the heat pipes 31 can be provided to receive heat load of both of the first heat generating part 26 and the second heat generating part 27, and thus the heat transporting performance of the first heat pipe can be dramatically improved. Further, the first heat generating part 26 and the second heat generating part 27 can be cooled down by a single path, and therefore the space occupied by the cooling mechanism 35 inside the housing 21 can be made small as compared to the case where a heat pipe is separately provided for each of heat generating parts. Further, the second heat pipe 32 is connected to the first heat pipe 31 at a position deviated from the middle portion 31C, which is the thermally connected portion to the first heat generating part 26. With this structure, it is possible to prevent the cooling mechanism 35 from increasing in size, which occurs when the thickness of the thermally connected portion increases.

Here, the portable computer 11 comprises the first top surface 26A provided in the first heat generating part 26, and the second top surface 27A provided in the second heat generating part 27 and having a projecting height with respect to one surface 25A of the printed wiring board 25, which is different from that of the first top surface 26A. The second heat pipe 32 includes the bent portion 32C at a position between the third end portion 32A and the fourth end portion 32B, and the bent portion 32C connect the third end portion 32A and the fourth end portion 32B to each other while making the third end portion 32A set along the second end portion 31B and the fourth end portion 32B set along with the second top surface 27A.

When there is a bent portion such as the bent portion 32C in the middle of a heat pipe, the working fluid cannot pass therethrough easily, which in some cases makes the heat transporting performance of the heat pipe lower. According to the above-described structure, the bent portion 32C is provided in the second heat pipe 32, by which it is not necessary to provide the bent portion 32C in the first heat pipe 31. In this manner, it is possible to prevent the lowering of the heat transporting performance in the first heat pipes 31 to which the heat load of both of the first heat generating part 26 and the second heat generating part 27 is applied. Further, the bent portion 32C provided in the second heat pipe 32 can absorb the difference in projecting height between the first heat generating part 26 and the second heat generating part 27. Therefore, even if there is such a difference in projecting height, the first heat generating part 26 and the second heat generating part 27 can be cooled down with a single path. In this manner, the space occupied by the cooling mechanism 35 inside the housing 21 can be made small.

At the same time, the first heat pipe 31 is arranged in a straight line along the first top surface 26A of the first heat generating part 26. With this structure, the heat transporting performance can be further improved in the first heat pipes 31.

The second heat pipe 32 has a smaller thickness dimension than that of the first heat pipes 31. With this structure, the rigidness of the second heat pipe 32 can be made lower as compared to that of the first heat pipes 31, and thus the second heat pipe 32 can be easily bent. Therefore, the process of forming the bent portion 32C in the second heat pipe 32 can be easily done. Further, in the assembling, the operator can finely adjust the angle of the bent portion 32 by hand, for example, and thus the operability can be remarkably improved.

In this case, the projecting height of the second top surface 27A projecting from one surface 25A is lower than the projecting height of the first top surface 26A projecting from one surface 25A, and the third end portion 32A of the second heat pipe 32 is secured to the surface 36 of the second end portion 31B of the first heat pipe 31, which faces the printed wiring board 25.

With this structure, the second heat pipe 32 can be located closer to the second top surface 27A of the second heat generating part 27. Therefore, the bent amount of the bent portion 32C can be made small, and therefore it is possible to prevent the heat transport amount from drastically lowering in the second heat pipe 32.

Further, the portable computer 11 further comprises the fan unit 34 which supplies air blow to the heat sink 33 in order to promote the cooling down of the heat sink 33. With this structure, the heat transmitted by a plurality of the first heat pipes 31 can be efficiently released to the outside. In this manner, the first heat generating part 26 and the second heat generating part 27 can be cooled down further efficiently.

Figure 6:
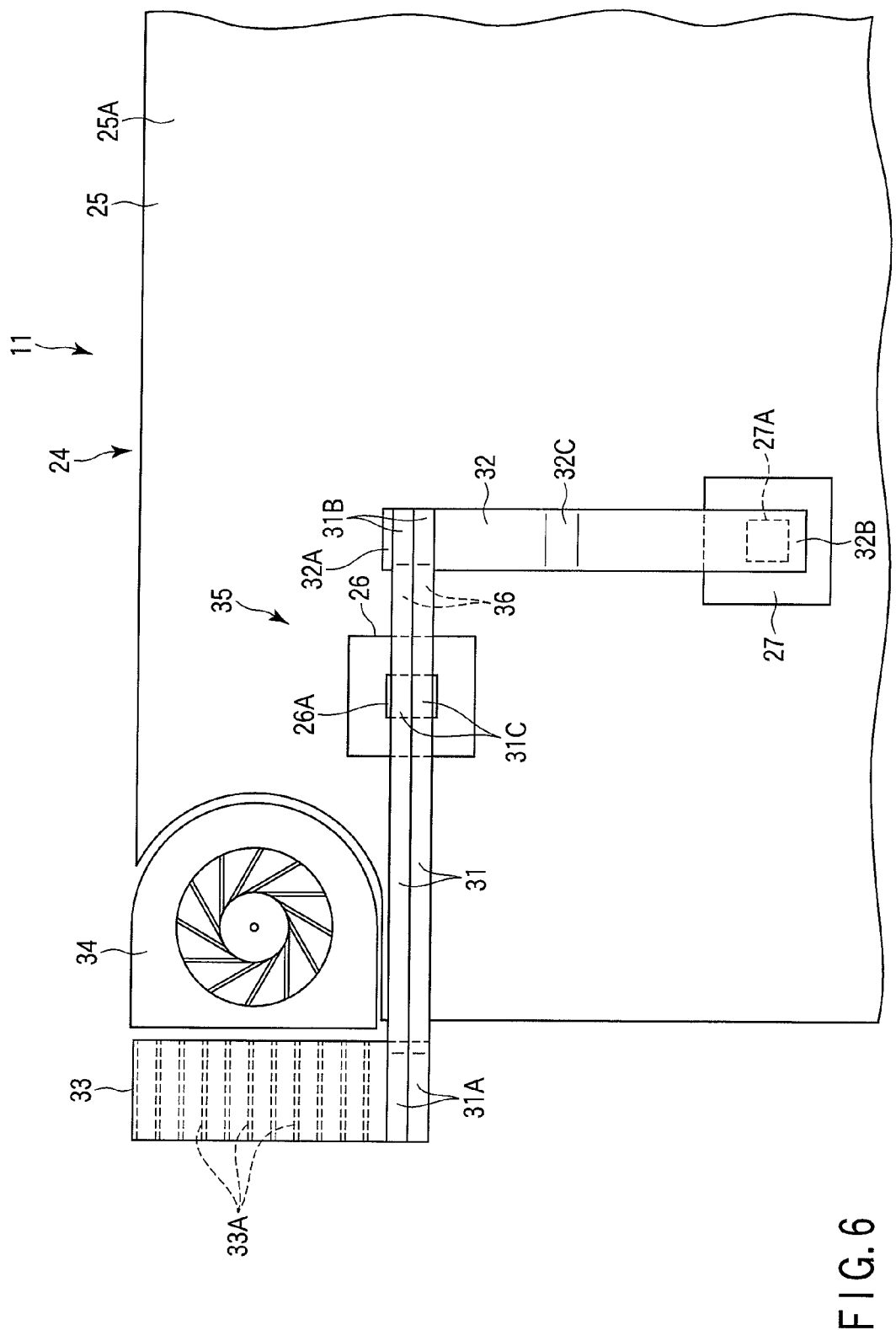
FIG. 6 is an exemplary top view of a printed circuit board and a cooling mechanism of a portable computer according to the second embodiment.

Next, the second embodiment of the electronic device will now be described with reference to FIG. 6. A portable computer 11, which is an example of the electronic device of the second embodiment, is different from that of the first embodiment in the position of the second heat generating part 27 and the set angle of the second heat pipe 32, and with respect to the other parts, the first and second embodiments share common parts. Therefore, the different parts will be mainly described in this embodiment. The common parts will be designated by the same reference symbols, and the explanations therefor will be omitted. The portable computer 11 has an appearance similar to that of the first embodiment shown in FIG. 1.

A printed circuit board 24 includes a printed wiring board 25, and a first heat generating part 26 and a second heat generating part 27 which are secured on one surface 25A of the printed wiring board 25. The first heat generating part 26 and the second heat generating part 27 are arranged at respective positions displaced in an oblique direction from each other. The projecting height of a second top surface 27A is lower than the projecting height of a first top surface 26A as in the first embodiment.

A second heat pipe 32 is formed by filling with a working fluid such as water inside a container formed of a copper material into a hollow flat plate shape and sealing it. The second heat pipe 32 extends in a direction crossing with the first heat pipe 31, that is, a direction normally crossing the first heat pipe 31.

A fourth end portion 32B is thermally connected to the second heat generating part 27. The third end portion 32A of the second heat pipe 32 is secured to a surface 36 of the second end portion 31B of the first heat pipe 31, which faces the printed wiring board 25. With this structure, the second heat pipe 32 can be located closer to the second top surface 27A of the second heat generating part 27, and therefore, the bent amount of the bent portion 32C can be made small. Note that the second end portion 31B and the fourth end portion 32B are fixed to each other by, for example, soldering.

According to the second embodiment, the second heat pipe 32 extends in a direction in which it crosses with the first heat pipe 31. With this structure, even if such a necessity arises that the direction must be converted within a plane along the printed wiring board 25, that is, within a plane parallel with the printed wiring board 25, it is not necessary to form a bent portion in the middle of each of the heat pipe 31 and the second heat pipe 32. In this manner, it is possible to prevent the lowering of the heat transporting performance of each of the first heat pipe 31 and the second heat pipe 32. Further, the second heat pipe 32 is made wider than the first heat pipe 31, and therefore it is easy as well to ensure thermal connection between the first heat pipe 31 and the second heat pipe 32.

Next, the third embodiment of the electronic device will now be described with reference to FIG. 7. A portable computer 11, which is an example of the electronic device of the third embodiment, is different from that of the first embodiment in the projecting height of the first top surface 26A of the first heat generating part 26, the projecting height of the second top surface 27A of the second heat generating part 27, the set position of the second heat pipe 32 and the bent direction of the bent portion 32C, and with respect to the other parts, the first and third embodiments share common parts. Therefore, the different parts will be mainly described in this embodiment. The common parts will be designated by the same reference symbols, and the explanations therefor will be omitted. The portable computer 11 has an appearance similar to that of the first embodiment shown in FIG. 1.

A printed circuit board 24 includes a printed wiring board 25, and a first heat generating part 26 and a second heat generating part 27 which are secured on one surface 25A of the printed wiring board 25. In this embodiment, the projecting height of a second top surface 27A with respect to one surface 25A of the printed wiring board 25 is different from the projecting height of a first top surface 26A with respect to one surface 25A of the printed wiring board 25. More specifically, the projecting height of the second top surface 27A is higher than the projecting height of the first top surface 26A.

The first heat pipe 31 is formed by filling with a working fluid such as water inside a container formed of a copper material into a cylindrical shape and sealing it. The first heat pipe 31 comprises a plurality of heat pipe portions. In this embodiment, for example, two heat pipe portions are included as in the case shown in FIG. 2.

The first heat pipe 31 is formed into a rod shape as a whole, and it comprises a first end portion 31A connected to the heat sink 33, a second end portion 31B located on an opposite side to the first end portion 31A, and an middle portion 31C provided at a position located between the first end portion 31A and the second end portion 31B. The first heat pipe 31 is thermally connected to the first heat generating part 26 at the middle portion 31C. It should be noted that a heat conductive grease or the like is provided to intercalate between the middle portion 31C and the first heat generating part 26. The first heat pipe 31 extends linearly along the first top surface 26A of the first heat generating part 26.

The second heat pipe 32 is formed by filling with a working fluid such as water inside a container formed of a copper material into a hollow flat plate shape and sealing it. The second heat pipe 32 is larger than the first heat pipe 31 in width dimension, and is formed into a wide and flat rod shape. The second heat pipe 32 comprises a third end portion 32A connected to the first end portion 31A of the first heat pipe 31, a fourth end portion 32B located on an opposite side to the third end portion 32A, and a bent portion 32C provided at a position located between the third end portion 32A and the fourth end portion 32B to connect them together. The bent portion 32C is smoothly bent such as to make the third end portion 32A placed along the second end portion 31B, and to make the fourth end portion 32B placed along the second top surface 27A.

Figure 7:
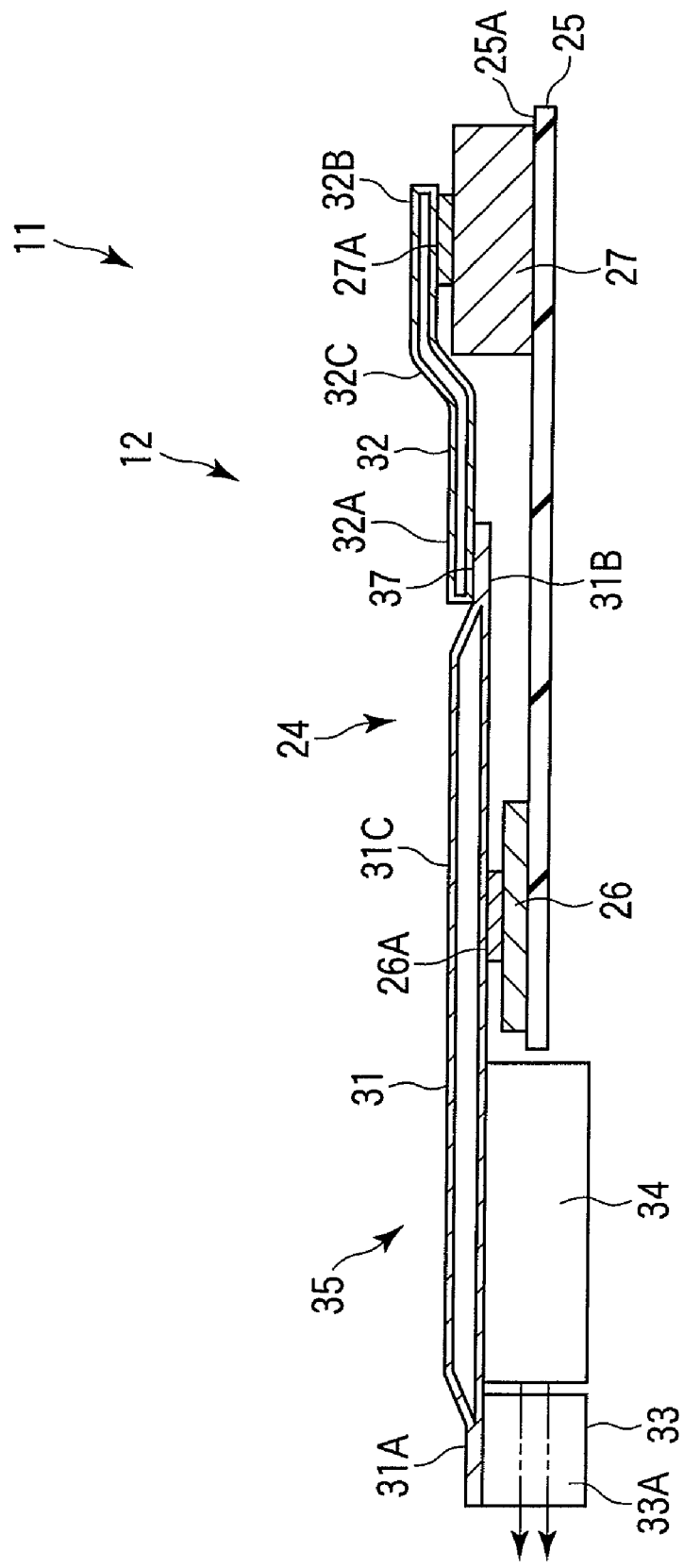
FIG. 7 is an exemplary vertical cross sectional view of a printed circuit board and a cooling mechanism of a portable computer according to the third embodiment.

It should be noted that in FIG. 7, the difference in height between the first heat generating part 26 and the second heat generating part 27 is shown with emphasis, but in reality, the difference in height between the first heat generating part 26 and the second heat generating part 27 is very small, and the bent portion 32c is formed to be bent in very small amount.

The fourth end portion 32B is thermally connected to the second heat generating part 27. The third end portion 32A of the second heat pipe 32 is secured to a surface 37 on an opposite side to the surface 36 of the second end portion 31B, which opposes the printed wiring board 25. With this arrangement, the second heat pipe 32 is positioned to a position close to the second top surface 27A of the second heat generating part 27, and thus the bent amount of the bent portion 32c is suppressed to a small level. The second end portion 31B and the fourth end portion 32B are secured to each other by, for example, soldering.

According to the third embodiment, the projecting height of the second top surface 27A projecting from one surface 25A of the printed wiring board 25 is higher than the projecting height of the first top surface 26A projecting from one surface 25A, and the third end portion 32A of the second heat pipe 32 is secured to a surface 37 on an opposite side to the surface 36 of the second end portion 31B of the first heat pipe 31, which faces the printed wiring board 25.

With this structure, the second heat pipe 32 can be located closer to the second top surface 27A of the second heat generating part 27. Therefore, the bent amount of the bent portion 32C can be made small, and therefore it is possible to prevent the heat transport amount from drastically lowering in the second heat pipe 32.

Next, the fourth embodiment of the electronic device will now be described with reference to FIG. 8. A portable computer 11, which is an example of the electronic device of the fourth embodiment, is different from that of the third embodiment in the position of the second heat generating part 27 and the set angle of the second heat pipe 32, and with respect to the other parts, the fourth and third embodiments share common parts. Therefore, the different parts will be mainly described in this embodiment. The common parts will be designated by the same reference symbols, and the explanations therefor will be omitted. The portable computer 11 has an appearance similar to that of the first embodiment shown in FIG. 1.

A printed circuit board 24 includes a printed wiring board 25, and a first heat generating part 26 and a second heat generating part 27 which are secured on one surface 25A of the printed wiring board 25. The first heat generating part 26 and the second heat generating part 27 are arranged at respective positions displaced in an oblique direction from each other. The projecting height of a second top surface 27A is higher than the projecting height of a first top surface 26A as in the first embodiment.

A second heat pipe 32 is formed by filling with a working fluid such as water inside a container formed of a copper material into a hollow flat plate shape and sealing it. The second heat pipe 32 extends in a direction crossing with the first heat pipe 31, that is, a direction normally crossing the first heat pipe 31.

A fourth end portion 32B of the second heat pipe 32 is thermally connected to the second heat generating part 27. The third end portion 32A of the second heat pipe 32 is secured to a surface 37 located on an opposite side to a surface 36 of the second end portion 31B of the first heat pipe 31, which faces the printed wiring board 25. With this structure, the second heat pipe 32 can be located closer to the second top surface 27A of the second heat generating part 27, and therefore, the bent amount of the bent portion 32C can be made small. Note that the second end portion 31B and the fourth end portion 32B are fixed to each other by, for example, soldering.

According to the fourth embodiment, the second heat pipe 32 extends in a direction in which it crosses with the first heat pipe 31. With this structure, even if such a necessity arises that the direction must be converted within a plane along the printed wiring board 25, that is, within a plane parallel with the printed wiring board 25, it is not necessary to form a bent portion in the middle of each of the heat pipe 31 and the second heat pipe 32. In this manner, it is possible to prevent the lowering of the heat transporting performance of each of the first heat pipe 31 and the second heat pipe 32. Further, the second heat pipe 32 is made wider than the first heat pipe 31, and therefore it is easy as well to ensure thermal connection between the first heat pipe 31 and the second heat pipe 32.

The electronic device is not limited to the portable computer 11 discussed in each of the above-described embodiments, but the present invention can be applied to other types of electronic devices, for example, mobile phones. Further, it is natural that the electronic device, when carrying out the present invention, can be remodeled into various types of modified versions as long as the essence of the invention does not fall out of its scope.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic device comprising:
a printed wiring board;
a first heat generator and a second heat generator on to a first surface of the printed wiring board;
a plurality of first heat pipes each comprising a first end portion, a second end portion on a side opposite to the first end portion and a middle portion between the first end portion and the second end portion, the middle portion being connected to the first heat generator;
a second heat pipe comprising a third end portion connected to the second end portion and a fourth end portion on a side opposite to the third end portion, the fourth end being connected to the second heat generator, and the second heat pipe comprising a width larger than a combined width of the plurality of first heat pipes; and
a heat sink connected to the first end portion.

2. The electronic device of claim 1, further comprising:
the first heat generator having a first to surface; and
the second heat generator having a second top surface, the second top surface comprising a second projecting height with respect to the first surface of the printed wiring board, different from a first projecting height of the first top surface,
wherein the second heat pipe comprises a curved portion at a position between the third end portion and the fourth end portion, and the curved portion is configured to connect the third end portion and the fourth end portion in such a manner that the third end portion is set along the second end portion and the fourth end portion is set along the second top surface.

3. The electronic device of claim 2, wherein the each of the plurality of first heat pipes is aligned linearly along the first top surface of the first heat generator.

4. The electronic device of claim 3, wherein the second heat pipe is thinner than the each of the plurality of first heat pipes.

5. The electronic device of claim 4, wherein the second projecting height of the second top surface projecting from the first surface of the printed wiring board is lower than the first projecting height of the first top surface projecting from the first surface, and
the third end portion of the second heat pipe is on to a surface of the second end portion of the each of the plurality of first heat pipes facing the printed wiring board.

6. The electronic device of claim 5, wherein the second heat pipe is extending in a direction intersecting the each of the plurality of first heat pipes.

7. The electronic device of claim 6, further comprising a fan configured to cool down the heat sink by supplying air flow to the heat sink.

8. The electronic device of claim 4, wherein the second projecting height of the second top surface projecting from the first surface of the printed wiring board is higher than the first projecting height of the first top surface projecting from the first surface, and
the third end portion of the second heat pipe is on to a surface on a side opposite to a surface of the second end portion of the each of the plurality of first heat pipes facing the printed wiring board.

9. The electronic device of claim 8, wherein the second heat pipe is extending in a direction intersecting each of the plurality of first heat pipes.

10. The electronic device of claim 9, further comprising a fan configured to cool down the heat sink by supplying air flow to the heat sink.

* * * * *